United States Patent [19]

Ball et al.

[11] 4,346,021

[45] * Aug. 24, 1982

[54] METHOD FOR PRODUCING ALUMINOSILICATES, THEIR USE AS CATALYSTS AND SUPPORTS AND METHOD FOR PRODUCING CATALYSTS THEREFROM

[75] Inventors: William J. Ball, Capel; Keith W. Palmer, Weybridge; David G. Stewart, Epsom, all of England

[73] Assignee: The British Petroleum Company Limited, London, England

[*] Notice: The portion of the term of this patent subsequent to Dec. 30, 1997, has been disclaimed.

[21] Appl. No.: 213,227

[22] Filed: Dec. 5, 1980

Related U.S. Application Data

[63] Continuation-in-part of Ser. No. 968,401, Dec. 11, 1978, Pat. No. 4,242,233.

[30] Foreign Application Priority Data

Dec. 25, 1977 [GB] United Kingdom ............... 53645/77

[51] Int. Cl.³ ...................... B01J 29/06; C01B 33/28
[52] U.S. Cl. ...................... 252/431 N; 252/431 P; 252/432; 252/455 Z; 260/448 C; 423/328; 423/329
[58] Field of Search .............................. 423/328–330; 260/448 C; 252/431 N, 431 P, 432, 455 Z

[56] References Cited

U.S. PATENT DOCUMENTS

| 3,702,886 | 11/1972 | Argauer et al. ...................... 423/328 |
| 4,089,929 | 5/1978 | Christophliemk et al. ......... 423/118 |
| 4,242,233 | 12/1980 | Ball et al. .............................. 423/329 |

FOREIGN PATENT DOCUMENTS

| 1955095 | 9/1970 | Fed. Rep. of Germany . |
| 2817577 | 10/1978 | Fed. Rep. of Germany . |
| 2746844 | 4/1979 | Fed. Rep. of Germany . |
| 1161974 | 8/1969 | United Kingdom . |
| 1365318 | 8/1974 | United Kingdom ............... 423/329 |
| 1471440 | 4/1977 | United Kingdom ............... 424/329 |

OTHER PUBLICATIONS

Charnel L, "Journal of Crystal Growth", vol. 8, 1971, pp. 291–294.

Zeitschrift fur Chemie, 13th Year, Heft 3, 1973, pp. 109–110.

Richter, "Textbook of Organic Chemistry", 2nd Ed., 1948, p. 244.

*Primary Examiner*—Edward J. Meros
*Attorney, Agent, or Firm*—Brooks, Haidt, Haffner & Delahunty

[57] ABSTRACT

Crystalline aluminosilicates having a high (greater than 10:1) silica to alumina molar ratio and an X-ray diffraction pattern substantially the same as that of ZSM-5 zeolite are prepared by mixing a source of silica, a source of alumina, a source of alkali metal, water and at least one monoalkanolamine selected from monoethanolamine and monopropanolamine or their precursors, the ratio of the source of silica to the source of alumina being at least 20:1 based on the equivalent moles of silica and alumina in their respective sources, and maintaining the mixture at a temperature of about 120° C. or 135° C. or more for a time such that crystallization occurs. Typical crystallization conditions are a temperature in the range 120° to 210° C., a pressure in the range from autogenous to 400 psig and a time not less than 4 hours and up to and in excess of 7 days. The crystalline product so-produced is useful, particularly after modification such as reduction of the alkali metal content as a conversion catalyst and catalyst support.

18 Claims, No Drawings

METHOD FOR PRODUCING ALUMINOSILICATES, THEIR USE AS CATALYSTS AND SUPPORTS AND METHOD FOR PRODUCING CATALYSTS THEREFROM

This application is a continuation-in-part of application Ser. No.: 968401 filed on Dec. 11, 1978, now U.S. Pat. No. 4,242,233.

The present invention relates to a method for preparing aluminosilicates useful as catalyst supports and with, or without, further modification as conversion catalysts. More particularly this invention relates to a method for preparing crystalline aluminosilicates having a high silica to alumina ratio and a ZSM-5 X-ray diffraction (XRD) pattern from a reaction mixture containing either monoethanolamine or monopropanolamine or their precursors.

Aluminosilicates, both natural and synthetic, have been shown to contain a wide variety of positive ions. These aluminosilicates are rigid three-dimensional networks of $SiO_4$ and $AlO_4$ in which the tetrahedra are crosslinked by the sharing of oxygen atoms whereby the ratio of the total aluminium and silicon atoms to oxygen is 1:2. The electrovalence of the tetrahedra containing aluminium is balanced by the inclusion of a cation in the three dimensional structure. This cation in the initially formed aluminosilicate is generally an alkali metal. Typical of this type of aluminosilicate is zeolite Y which has a characteristic XRD pattern and the chemical composition:

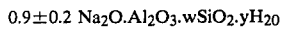

$$0.9 \pm 0.2\ Na_2O.Al_2O_3.wSiO_2.yH_2O$$

in which w is a number between 3 and 6 and y has a value up to 9, as described in German Patent Specification No: 1955095. In this synthesis the triethanolamine is added for the purpose of reducing the crystallisation time though it also facilitates the use of lower silica to alumina molar ratios in the crystallisation mixture than are normally employed for the production of zeolite Y.

It has also been proposed to include in the aluminosilicate organic nitrogen cations notably quaternary ammonium cations such as tetramethylammonium, tetraethylammonium, tetrapropylammonium and tetrabutylammonium. Inorganic cations can be exchanged either in their entirety or partially by another type of cation utilising ion exchange techniques in a conventional manner. On the other hand, due to pore size limitations, organic cations are not necessarily susceptible to further cation exchange. In the hydrated form molecules of water occupy the spaces between the tetrahedra.

In the past, techniques of synthesising aluminosilicates have involved the use of solutions containing a source of silica, alumina, alkali metal and the cation in the form in which it would exist in the synthesised aluminosilicate. This method became rather expensive with the advent of crystalline aluminosilicates containing tetraalkylammonium cations. The synthesis of these aluminosilicates involved the addition of expensive quaternary ammonium cations to a reaction mixture in order to obtain the desired aluminosilicate. Furthermore in order to exchange an ammonium or other cation into the aluminosilicate prior to producing the active form of the catalyst it was necessary to calcine the aluminosilicate to decompose the quaternary ammonium cation.

A range of crystalline aluminosilicates having a "high", that is 10:1 or more, silica to alumina molar ratio, high stability, extremely high acidity, and the ability to catalyse many kinds of conversion reactions are prepared from one or more quaternary alkylammonium compounds in U.S. Pat. No. 3,702,886. The crystalline aluminosilicates prepared from tetrapropylammonium hydroxide in that patent were designated ZSM-5 zeolites and their X-ray diffraction patterns were given. However the use of quaternary alkylammonium compounds is not without its disadvantages, not the least of which is their high cost. British Patent Specification No.: 1365318 discloses an attempt to overcome this disadvantage by employing in the synthesis the precursors of the tetraalkylammonium compound, i.e. $R_1R_2R_3N + R_4X$ in which $R_1, R_2$ and $R_3$ are selected from aryl, substituted aryl, alkyl, substituted alkyl, cycloalkyl, substituted cycloalkyl and hydrogen, $R_4$ is alkyl, substituted alkyl, cycloalkyl, substituted cycloalkyl, aryl and substituted aryl and X is an electronegative group. This method only partially alleviates the expense problem and does not eliminate a further disadvantage associated with crystalline aluminosilicates prepared from tetraalkylammonium compounds, namely that in order to exchange an ammonium or other cation into the aluminosilicate preliminary to producing the active form it is necessary to calcine the aluminosilicate.

British Pat. No.: 1 471 440, claiming a method for synthesising a crystalline aluminosilicate zeolite containing an organic nitrogen cation, wherein a reaction mixture comprising sources of silica, alumina and alkali metal, water and a primary amine having 2 to 10 carbon atoms is prepared and maintained under conditions of temperature and pressure to effect crystallisation of said aluminosilicate zeolite, purports to overcome the disadvantages inherent in the aforesaid methods for synthesising crystalline aluminosilicates. The Examples in the complete specification describe the use of a wide variety of primary amines in the preparation of crystalline aluminosilicates and the use of a few unsubstituted secondary amines in the preparation of both crystalline and amorphous aluminosilicates.

In accordance with our invention it has been found that crystalline aluminosilicates having a high silica to alumina ratio and an X-ray diffraction pattern which is characteristic of the ZSM-5 zeolites can be prepared without an organic cation contained therein from either monoethanolamine or monopropanolamine or a mixture or the precursors thereof, which materials are readily available on an industrial scale.

According to the present invention there is provided a method for preparing a crystalline aluminosilicate having a high silica to alumina molar ratio and an X-ray diffraction pattern substantially the same as that of ZSM-5 zeolite, which method comprises mixing a source of silica, a source of alumina, a source of alkali metal, water and at least one monoalkanolamine selected from the group consisting of monoethanolamine and monopropanolamine, the ratio of said source of silica to said source of alumina being at least 20:1 based on the equivalent moles of silica and alumina in said respective sources, and maintaining said mixture at a temperature of about 120° C. or 135° C. or more for a time such that crystallisation occurs.

Suitable sources of silica include, for example sodium silicate, silica hydrosol, silica gel, silica sol and silicic acid. The preferred source of silica is an aqueous colloidal dispersion of silica particles. A suitable commercially available source of silica is LUDOX Colloidal Silica manufactured by Du Pont (LUDOX is a Registered Trade Mark).

Suitable sources of alumina include, for example sodium aluminate, aluminium sulphate and alumina. The preferred source of alumina is sodium aluminate prepared by dissolving alumina particles in excess sodium hydroxide solution.

Suitable sources of alkali metal include alkali metal hydroxides and alkali metal oxides. Preferably the alkali metal is sodium.

It will be appreciated that each source of silica, alumina and alkali metal can be supplied by one or more initial reactants and then mixed together in any order. For example sodium silicate is a source of both sodium and silica.

Monoethanolamine and monopropanolamine are generally prepared by the reaction of an alkylene oxide with ammonia. The reaction may be represented as follows:

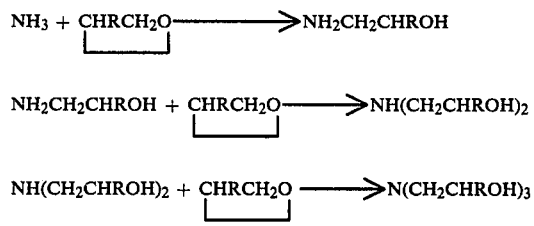

wherein R is either an H atom or a methyl group. Thus in practice reaction of ammonia with an alkylene oxide produces a mixture of mono-, di- and trialkanolamines which may be separated by fractionation techniques well-known in the art. Generally the monoalkanolamine can readily be separated in a relatively pure form leaving a mixture containing all the di- and trialkanolamine in admixture.

The reaction of ammonia and an alkylene oxide is exothermic and is usually carried out at a temperature in the range 50° to 100° C. and a pressure in the range 150 to 300 psi. The reaction may be carried out, at controlled temperature and pressure, either in a coil-type reactor by continuously pumping aqueous ammonia and alkylene oxide into the coil, or in a kettle-type reactor by slowly pumping the alkylene oxide into the ammonia solution contained in the agitated kettle. Because water aids temperature control by removing reaction heat it is advantageous to use aqueous ammonia at a concentration of 25 to 50%, although processes using low concentrations of water or anhydrous processes may be employed. The relative proportions of mono-, di- and trialkanolamines that can be obtained by the above procedure are dependent upon the ratio of ammonia to alkylene oxide used. A large excess of ammonia favours the formation of the monoalkanolamine.

Alkylene oxides will react with nearly all nitrogen compounds having one or more hydrogen atoms attached to the nitrogen. Thus a number of mixed monoalkanolamines can be made by reacting ethylene oxide with, for example, monoisopropanolamine or by reacting propylene oxide with monoethanolamine under the conditions hereinbefore described for the reaction of an alkylene oxide with ammonia.

Although the reaction of alkylene oxides and ammonia is the chief commercial method for the preparation of monoalkanolamines, other means of synthesising these products are also known. For example, preparation may be carried out by the ammonolysis of a halohydrin as follows:

$$HOCHRCH_2Cl + 2NH_3 \rightarrow HOCHRCH_2NH_2 + NH_4Cl$$

Since alkylene oxides, such as ethylene oxide and propylene oxide, and ammonia are readily available on an industrial scale, monoethanolamine and monopropanolamine are relatively inexpensive materials when compared with primary amines, for example.

Furthermore, and this is a particular advantage of the present invention, we have found that the desired crystalline aluminosilicates can be prepared from the precursors of monoalkanolamines without the need to isolate the alkanolamines themselves, thereby effectively eliminating a step in the production process if so desired.

Thus a preferred embodiment of the present invention provides a method for preparing a crystalline aluminosilicate having a high silica to alumina molar ratio and an X-ray diffraction pattern substantially the same as that of ZSM-5 zeolite, which method comprises mixing a source of silica, a source of alumina, a source of alkali metal, water and the precursors of at least one monoalkanolamine selected from the group consisting of monoethanolamine and monopropanolamine, said precursors consisting of ethylene oxide or propylene oxide and combinations thereof and the ratio of said source of silica to said source of alumina being at least 20:1 based on the equivalent moles of silica and alumina in said respective sources, and maintaining said mixture at a temperature of about 120° C. or 135° C. or more for a time such that crystallisation occurs.

The ammonia may be added as a gas or as an aqueous ammoniacal solution. Preferably an excess of ammonia over the stoichiometric amount required to form the monoalkanolamine is used, thereby favouring the formation of the monoalkanolamine. Provided that the molar ratio of ammonia to alkylene oxide added is greater than 1:1 it may vary within wide limits, though a ratio in the range 10:1 to 2:1 is preferred.

The mixing may be effected by passing one or other or both the alkylene oxide and the ammonia in the form of a vapour into an aqueous mixture containing the remainder of the reactants. Alternatively, the alkylene oxide and the ammonia are preferably added in the form of liquids to the aqueous mixture containing the source of silica, the source of alumina and the source of the alkali metal.

In a preferred method of preparation an aqueous ammoniacal solution is mixed with an aqueous solution of an alkylene oxide and the resulting mixture is further mixed with a source of silica, a source of alumina, a source of alkali metal and water and the mixture so-formed maintained under reaction conditions which effect formation of the aluminosilicate. In this embodiment of the invention it is believed that the formation of the aluminosilicate proceeds through the intermediate formation of the monoalkanolamine.

Whether the monoethanolamine or monopropanolamine is added as such or in the form of their precursors, the conditions which effect the formation of the crystalline aluminosilicate are identical. Thus the temperature is preferably in the range from about 120° to 210° C., even more preferably in the range from about 135° to 190° C. However, as is well known in the art the use of particularly advantageous conditions, such as seeding i.e. the introduction of a small amount of the desired crystalline material, may allow the use of lower temperatures if so desired. The pressure may suitably be autogenous pressure, that is the pressure generated at the temperature employed, though pressures above autogenous pressure and as high as 400 psig may be used. Preferably the pressure may range from about autogenous to 250 psig. The mixture may suitably be maintained under the aforesaid conditions for a time not less than 4 hours, preferably at least 20 hours. Generally a time of about 48 hours will be found suitable though times up to and in excess of 7 days may be employed. Of course the crystallisation time should not be so protracted that the crystalline aluminosilicate produced is converted to quartz.

The sources of silica, alumina and alkali metal, water and monoalkanolamine or mixture thereof may be mixed in quite wide proportions. The ratio of the source of silica to the source of alumina, based on the equivalent moles of silica and alumina in the respective sources, should be at least 20:1, preferably in the range from 20:1 to 150:1 and even more preferably in the range from 20:1 to 100:1. The ratio of the number of moles of alkali metal to the number of mole equivalents of total silica and alumina in the sources of silica and alumina may be in the range from 2:1 to 0.02:1, preferably from 1:1 to 0.1:1. The ratio of the number of moles of monoalkanolamine to the number of mole equivalents of total silica and alumina in the sources of silica and alumina may suitably be in the range from 10:1 to 0.02:1, preferably from 10:1 to 0.1:1. Although the amount of water present in the mixture is not critical to the performance of the invention it is well known in the art that there must be sufficient water present to dissolve the reagents and not so much that the mixture is too dilute for crystallisation to occur.

The reaction is suitably carried out in a closed vessel capable of withstanding the elevated pressures generally employed. Furthermore the mixture is preferably agitated during crystallisation of the aluminosilicate. The crystalline aluminosilicate so-produced is preferably separated from the mother liquor by filtration and thereafter is preferably washed, suitably with water at a temperature in the range, for example, of from 15° to 95° C.

Crystalline aluminosilicates prepared by the method of the invention may be used as catalysts or as catalyst supports. The crystalline aluminosilicate may be used on its own or admixed with up to 80% by weight of another support material such as silica, alumina or another aluminosilicate. Before use as a catalyst or a catalyst support it is desirable to modify the crystalline aluminosilicate in one or a number of ways. Thus for many catalytic purposes it is preferred to reduce the alkali metal content of the aluminosilicate, suitably to a level of no more than 0.2% by weight, preferably to below 0.15% by weight. This may be achieved by subjecting the aluminosilicate to one or more ion-exchanges with a solution containing suitable cations. For example, the aluminosilicate may be ion-exchanged with a solution containing ammonium cations and thereafter calcined to produce the active hydrogen-form of the aluminosilicate. It is an advantage of the method of the present invention that the crystalline aluminosilicates produced thereby do not require calcination before ion-exchange, as do crystalline aluminosilicates containing the bulky quaternary ammonium cations.

Before ion-exchange it may be preferable to treat the aluminosilicate with a solution of an acid, e.g. an aqueous mineral acid. Before catalytic use it is preferred to activate the crystalline aluminosilicate suitably by heating in air at a temperature in the range 400° to 700° C. for a period of from 2 to 48 hours.

Further the aluminosilicate may be impregnated with a compound of one or more metals, preferably with a compound of one or more metals belonging to Groups IB, IIB, IIIA, IVA, VA or VIII of the Periodic Table of the Elements as published in the Handbook of Chemistry and Physics. Suitable metals include copper, silver, zinc, gallium, indium, thallium, lead, antimony, bismuth, iron, cobalt, nickel, ruthenium, rhodium, palladium, iridium and platinum. The impregnated aluminosilicate preferably contains from 0.1 to 5.0% by weight of the metal(s). The compounds of the metals used are suitably those compounds which will decompose on the application of heat to form the corresponding oxides and which are soluble in water, e.g. the nitrates or chlorides. The aluminosilicates may thus be impregnated with an aqueous solution of a compound of the desired metal and the impregnated mass thereafter calcined to produce the metal oxide 'in situ' deposited in the interstices of the aluminosilicate structure. Alternatively or in addition the metal or metals may be incorporated by ion-exchange. In a further embodiment of the invention the aluminosilicate employed additionally contains one or more non-metallic elements belonging to Groups IIIA and VA of the Periodic Table, especially boron and phosphorus. The non-metallic element may be incorporated into the aluminosilicate by treatment with a suitable compound containing the non-metallic element, e.g. phosphoric acid, trimethyl-phosphate or phosphorus trichloride followed by heating. The amount of the non-metallic element present in the impregnated aluminosilicate preferably ranges from 0.1 to 5.0% by weight.

The aluminosilicates so-prepared, with or without the hereinbefore described treatments and/or modifications, may be used as catalysts in the form of a fixed or a fluidised bed in alkylation, dehydrocyclodimerisation, oligomerisation, isomerisation and hydrogenation reactions. Additionally the aluminosilicates may be used as catalysts in the dehydration of alcohols and ethers.

The following Examples are given for the purpose of illustrating the invention.

In the Examples reference will be made to the X-ray diffraction (XRD) patterns. These were determined by standard techniques using, as the radiation, the K-alpha doublet of copper. Reference will also be made to the elemental composition which was determined by X-ray fluorescence analysis (XRF) and atomic absorption spectroscopy (AAS).

EXAMPLE 1

Alumina, Laporte Type A (1.3 g, 0.013 mole) was dissolved in a hot solution of sodium hydroxide (1.95 g, 0.049 mole) in deionised water (18.8 g, 1.044 mole). To this was added a mixture of Ludox colloidal silica (75 g, containing 30% silica, 0.375 mole) in a solution of monoethanolamine (10.9 g, 0.178 mole) dissolved in deionised water (56.3 g, 3.128 mole).

The resultant mixture was then placed in a revolving stainless steel pressure vessel and heated at 170° C. for 66 hours. The resultant solid product was filtered and washed with deionised water (500 ml). The aluminosilicate was ion-exchanged by heating with one molar ammonium chloride solution at 70°–80° C. for 1 hour.

This operation was repeated twice. The solid was washed with deionised water (250 ml) and dried at 120° C. for 16 hours. The aluminosilicate prepared was crushed to pass 16 mesh (BSS) and activated by heating in air at 500° C. for 16 hours. X-ray diffraction analysis of the sample showed it to be a crystalline material with an X-ray diffraction pattern as shown in Table 1.

The following analyses of the sample were obtained:

| | |
|---|---|
| wt. percent silicon | 42 |
| wt. percent aluminium | 1.93 |
| wt. percent sodium | less than 0.01 |

TABLE 1

| TWO THETA | INTERPLANAR SPACING d(Angstrom) | RELATIVE INTENSITY $(I/I_o)$ |
|---|---|---|
| 7.856 | 11.253 | 85 |
| 8.768 | 10.085 | 67 |
| 9.012 | 9.813 | 16 |
| 11.827 | 7.482 | 4 |
| 13.126 | 6.745 | 4 |
| 13.836 | 6.400 | 9 |
| 14.706 | 6.024 | 14 |
| 15.457 | 5.733 | 10 |
| 15.832 | 5.598 | 10 |
| 17.568 | 5.048 | 6 |
| 17.748 | 4.997 | 7 |
| 19.188 | 4.630 | 6 |
| 20.274 | 4.380 | 7 |
| 20.793 | 4.272 | 13 |
| 22.109 | 4.021 | 8 |
| 23.015 | 3.864 | 100 |
| 23.234 | 3.828 | 72 |
| 23.643 | 3.763 | 34 |
| 23.860 | 3.729 | 37 |
| 24.336 | 3.657 | 27 |
| 24.726 | 3.601 | 3 |
| 25.504 | 3.493 | 5 |
| 25.825 | 3.450 | 8 |
| 26.140 | 3.409 | 4 |
| 26.341 | 3.383 | 4 |
| 26.545 | 3.358 | 8 |
| 26.832 | 3.323 | 8 |
| 27.414 | 3.253 | 3 |
| 29.211 | 3.057 | 11 |
| 29.796 | 2.999 | 10 |
| 29.966 | 2.982 | 10 |
| 30.296 | 2.950 | 6 |

EXAMPLE 2

Alumina, Laporte Type A (0.85 g, 0.008 mole) was dissolved in a hot solution of sodium hydroxide (1.3 g, 0.003 mole) in deionised water (25 ml, 1.389 mole). To this was added a mixture of Ludox colloidal silica (50 g, containing 30% silica, 0.25 mole) in a solution of monoethanolamine (12.5 g, 0.205 mole) dissolved in deionised water (37.5 g, 2.083 mole).

The resultant mixture was then placed in a revolving stainless steel pressure vessel and heated at 170° C. for 48 hours. The resultant solid product was filtered and washed with deionised water (500 ml). The filter-cake was suspended in an aqueous solution of ammonia (100 ml 910 ammonia solution/100 ml deionised water) and stirred for one hour. The mixture was filtered and the solid washed with deionised water (500 ml). After washing, the aluminosilicate so-prepared was dried at 120° C. for 16 hours, crushed to pass 16 mesh (BSS) and calcined by heating in air at 500° C. for 16 hours. X-ray diffraction analysis of the sample showed it to be a crystalline material with an X-ray diffraction pattern essentially the same as that shown in Table 1.

EXAMPLE 3

Ethylene oxide (11 g) and 910 ammonia solution (42 ml, containing 25% ammonia) were cooled to 5° C. and then mixed with stirring. Alumina, Laporte Type A (1.7 g) was dissolved in a hot solution of sodium hydroxide (2.6 g) in deionised water (25 ml). The solution was cooled to room temperature and added with stirring to Ludox colloidal silica (100 g, containing 30% silica) and deionised water (75 ml). This mixture was cooled to 5° C. and the ethylene oxide/ammonia solution was added with stirring.

The resultant mixture was allowed to warm to room temperature, placed in a revolving stainless steel pressure vessel and heated at 170° C. for 60 hours. The resultant solid product was cooled to room temperature, filtered and washed with deionised water (500 ml). The filter-cake was suspended in an aqueous solution of ammonia (200 ml 910 ammonia solution/200 ml deionised water) and stirred for 30 minutes. The mixture was filtered and the solid washed with deionised water (200 ml). After washing the aluminosilicate so-prepared was dried at 120° C. for 16 hours.

This Example demonstrates a method for preparing an aluminosilicate starting with the precursors of the monoethanolamine, namely ethylene oxide and ammonia.

EXAMPLE 4

This example illustrates the preparation of an aluminosilicate using 3-amino-1-propanol.

Alumina, Laporte Type A (0.89 g, 0.009 mole) was dissolved in a hot solution of sodium hydroxide (1.36 g, 0.034 mole) in deionised water (12.5 ml, 0.694 mole). To this solution was added a mixture of Ludox colloidal silica (52.5 g, containing 30% silica, 0.263 mole) and monopropanolamine (9.5 g, 0.146 mole). The pH of the mixture was 12.8. The resulting mixture was then placed in a revolving stainless steel pressure vessel and heated at 170° C. for 66 hours.

The crystalline solid product so-obtained was filtered and the filter-cake was ion-exchanged by heating in an ammonium chloride solution (1 M, 150 ml). This operation was repeated twice. The solid was then washed with deionised water and dried at 120° C. for 16 hours before being calcined at 500° C. for 16 hours in air. X-ray diffraction analysis of the sample showed it to be a crystalline material with an X-ray pattern essentially the same as that shown in Table 1.

EXAMPLE 5

This example illustrates the preparation of an aluminosilicate using 1-amino-2-propanol.

The preparation was as described in Example 4. X-ray diffraction analysis of the sample showed it to be a crystalline material with an X-ray pattern essentially the same as that shown in Table 1.

EXAMPLE 6

10 g of the crystalline aluminosilicate prepared as described in Example 1 was mixed with 10 g Ludox colloidal silica (containing 30% by weight silica) and the suspension evaporated to dryness on a steam-bath and finally dried at 120° C. The solid was then broken down to form 5–16 mesh (BSS) granules.

8.0 g of the granules were mixed with an aqueous gallium nitrate solution (6 ml, containing 0.05 g gallium/ml) and the whole evaporated to dryness on a steam-bath. The solid was dried at 120° C. for 16 hours and activated by heating in air at 500° C. for 16 hours.

The catalyst was tested for the dehydrocyclodimerisation of $C_3$-hydrocarbon mixtures to aromatics. A gaseous feed of a $C_3$-hydrocarbon mixture (78.1% v/v propane, 19.1% v/v propylene and 2.8% v/v ethane) was passed over the catalyst contained in a heated tube.

The conditions used and the results obtained are given in Table 2. The terms used in the Table are defined as follows:

$$\text{Contact time} = \frac{\text{Volume of catalyst in mls}}{\text{Total volume of gas (in mls/sec at NTP)}}$$

$$C_3 \text{ Conversion} = \frac{\text{Moles of } C_3\text{-hydrocarbon consumed}}{\text{Moles of } C_3\text{-hydrocarbon fed}} \times 100$$

$$\text{Molar yield} = \frac{\text{Moles of } C_3\text{-hydrocarbon converted to particular product}}{\text{Moles of } C_3\text{-hydrocarbon fed}} \times 100$$

$$\text{Selectivity} = \frac{\text{Moles of } C_3\text{-hydrocarbon converted to particular product}}{\text{Moles of } C_3\text{-hydrocarbon consumed.}} \times 100$$

The catalyst was tested as described in Example 7 and the conditions used and the results obtained are given in Table 3.

EXAMPLE 10

The aluminosilicate prepared as described in Example 5 was processed and tested as described in Example 7. The conditions used and the results obtained are given in Table 3.

TABLE 3

Conditions and Results

| Example | Contact time* (secs at NTP) | Reaction Temperature (°C.) | % Yield on methanol fed** $C_2$ | $C_3$ | $C_4$ | Methanol conversion*** (%) |
|---|---|---|---|---|---|---|
| 7 | 2.7 | 400 | 9 | 15 | 17 | 100 |
| 8 | 3.0 | 400 | 6 | 16 | 22 | 100 |
| 9 | 2.9 | 400 | 10 | 25 | 32 | 100 |
| 10 | 3.0 | 450 | 7 | 30 | 29 | 100 |

*The contact time is defined as:
$$\frac{\text{Volume of catalyst in mls}}{\text{Total volume of gas (in mls/sec at NTP)}}$$
**The % yield of $C_2$ on methanol fed is defined as:
$$\frac{\text{Moles of methanol converted to } C_2}{\text{Total moles of methanol fed}}$$
***The remaining products were a complex mixture of straight- and branched-chain hydrocarbons and aromatics.

TABLE 2

Conditions and Results

| Ex. | Hours on stream | Reaction temperature (°C.) | Contact time (secs) | $C_3$ Conversion (%) | Molar Yields³(%) $CH_4$ | $C_2H_4$ | $C_2H_6$ | Aromatics | Selectivity to Aromatics (%) | Composition of aromatics* (% wt/wt) Benzene | Toluene | Xylene |
|---|---|---|---|---|---|---|---|---|---|---|---|---|
| 6 | 2 | 550 | 16.9 | 4.2 | 7 | 3 | 5 | 27 | 64 | 28 | 47 | 14 |

*The remaining products were polymethylbenzenes.

EXAMPLE 7

The catalytic activity of the activated aluminosilicate prepared as described in Example 2 was tested by passing a gaseous feed of methanol over the catalyst contained in a heated quartz reactor. The reaction conditions, the yields of ethylene, $C_3$ and $C_4$ hydrocarbons obtained therefrom and the methanol conversions are given in Table 3.

EXAMPLE 8

10 g of the dry aluminosilicate powder prepared by the method described in Example 3 was crushed to pass 16 mesh (BSS) and mixed with 10 g Ludox colloidal silica (containing 30% by weight silica), evaporated to dryness on a steambath and finally dried at 120° C. The mixture was then broken down to pass 5-8 mesh (BSS) and activated by heating in air at 500° C. for 16 hours.

The aluminosilicate-containing mixture was then tested for catalytic activity in the manner described in Example 7 under the conditions and with the results given in Table 3.

EXAMPLE 9

10 g of aluminosilicate prepared as described in Example 4 was mixed with 10 g Ludox colloidal silica (containing 30% by weight silica) and the suspension evaporated to dryness on a steam-bath and finally dried at 120° C. The solid was then broken down to form 5-16 mesh (BSS) granules and activated by calcining in air at 500° C. for 5 hours.

Examples 6 to 10 demonstrate that the aluminosilicate prepared as described in Examples 1 to 5 are active catalysts for hydrocarbon conversion reactions, and for the dehydration of methanol.

We claim:

1. A method for preparing a crystalline aluminosilicate having a high silica to alumina molar ratio and an X-ray diffraction pattern substantially the same as that of ZSM-5 zeolite, which method comprises mixing a source of silica, a source of alumina, a source of alkali metal, water and at least one monoalkanolamine selected from the group consisting of monoethanolamine and monopropanolamine, the ratio of said source of silica to said source of alumina being at least 20:1 based on the equivalent moles of silica and alumina in said respective sources, maintaining said mixture at a temperature above about 120° C. and recovering the crystalline aluminosilicate formed.

2. A method according to claim 1 wherein said monoalkanolamine is monoethanolamine.

3. A method according to claim 1 wherein said monoalkanolamine is monopropanolamine.

4. A method for preparing a crystalline aluminosilicate having a high silica to alumina molar ratio and an X-ray diffraction pattern substantially the same as that of ZSM-5 zeolite which method comprises mixing a source of silica, a source of alumina, a source of alkali metal, water and the precursors of at least one monoalkanolamine selected from the group consisting of monoethanolamine and monopropanolamine, said precursors consisting of ethylene oxide or propylene oxide and combinations thereof and ammonia, the ratio of said source of silica to said source of alumina being at least 20:1 based on the equivalent moles of silica and alumina in said respective sources, maintaining said mixture at a temperature above about 120° C. and recovering the crystalline aluminosilicate formed.

5. A method according to claim 4 wherein the ratio of said ammonia to said alkylene oxide in said mixture is in the range from 10:1 to 2:1.

6. A method according to claim 4 wherein said precursors are ethylene oxide and ammonia.

7. A method according to either claim 1 or claim 4 wherein said temperature is in the range from 135° to 210° C.

8. A method according to either claim 1 or claim 4 wherein said temperature is in the range from 135° to 190° C.

9. A method according to claim 1 or claim 4 wherein said crystalline aluminosilicate formed is recovered after a time of not less than 4 hours.

10. A method according to claim 1 or claim 4 wherein said ratio of said source of silica to said source of alumina is in the range from 20:1 to 150:1.

11. A method according to claim 1 or claim 4 wherein the ratio of the number of moles of alkali metal in said source of alkali metal to the number of mole equivalents of total silica and alumina in said respective sources of silica and alumina is in the range from 2:1 to 0.02:1.

12. A method according to claim 1 or claim 4 wherein the ratio of the number of moles of said monoalkanolamine to the number of mole equivalents of total silica and alumina in said respective sources of silica and alumina is in the range from 10:1 to 0.02:1.

13. A method according to claim 1 or claim 4 wherein the alkali metal content of said crystalline aluminosilicate product is reduced to a level of 0.2% by weight or less by subjecting it to one or more ion-exchanges.

14. A method according to claim 1 or claim 4 wherein the active hydrogen-form of said crystalline product is formed by ion-exchanging it with a solution containing ammonium cations and thereafter calcining the ammonium ion-exchanged crystalline aluminosilicate.

15. A method according to claim 1 wherein said crystalline aluminosilicate reaction product is activated by heating in air at a temperature in the range 400° to 700° C. for a period of from 2 to 48 hours.

16. A method according to claim 1 or claim 4 wherein said crystalline aluminosilicate reaction product is impregnated with a compound of at least one metal selected from the group consisting of copper, silver, zinc, gallium, indium, thallium, lead, antimony, bismuth, iron, cobalt, nickel, ruthenium, rhodium, palladium, iridium and platinum.

17. A method according to claim 1 or claim 4 wherein said crystalline aluminosilicate reaction product is impregnated with a compound of gallium.

18. A method according to claim 1 or claim 4 wherein said method includes a step of incorporating a non-metallic element selected from the group consisting of phosphorus and boron into said crystalline aluminosilicate.

* * * * *